(12) United States Patent
Bailey

(10) Patent No.: US 6,961,907 B1
(45) Date of Patent: *Nov. 1, 2005

(54) "APPEND" EXTENSION TO CUT AND COPY COMMANDS FOR A CLIPBOARD FUNCTION IN A COMPUTER SYSTEM

(75) Inventor: John Hudson Bailey, Aptos, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1826 days.

(21) Appl. No.: 08/676,500

(22) Filed: Jul. 3, 1996

(51) Int. Cl.[7] .............................................. G06F 15/00
(52) U.S. Cl. ...................................... 715/770; 715/769
(58) Field of Search ................................. 395/333, 335, 395/339, 346, 347, 356, 802, 803, 793, 792, 975; 345/333, 335, 339, 347, 356; 715/770, 769, 840

(56) References Cited

U.S. PATENT DOCUMENTS

| | | | | | |
|---|---|---|---|---|---|
| 5,404,442 A | * | 4/1995 | Foster et al. | ................. | 395/793 |
| 5,420,976 A | * | 5/1995 | Schell et al. | ................. | 395/793 |
| 5,559,942 A | * | 9/1996 | Gough et al. | ................ | 395/347 |
| 5,579,466 A | * | 11/1996 | Habib et al. | ................. | 395/793 |
| 5,630,080 A | * | 5/1997 | Malamud et al. | ............ | 395/975 |
| 5,790,114 A | * | 8/1998 | Geaghan et al. | ............ | 345/326 |
| 5,801,693 A | * | 9/1998 | Bailey | ......................... | 345/145 |

* cited by examiner

*Primary Examiner*—Cao (Kevin) Nguyen
(74) *Attorney, Agent, or Firm*—Gates & Cooper LLP

(57) ABSTRACT

A method, apparatus, and article of manufacture providing an "append" extension to cut and copy commands for a clipboard function in a computer system. Data is displayed on a monitor of the computer and a first command is received from an operator to select a portion of the data displayed on the monitor. A second command is then received from the operator to copy or cut the selected portion into a clipboard in a memory of the computer, wherein the second command indicates whether to replace the contents of the clipboard with the selected portion or whether to append the selected portion to the contents of the clipboard.

21 Claims, 8 Drawing Sheets

"APPEND" EXTENSION TO CUT AND COPY COMMANDS FOR A CLIPBOARD FUNCTION IN A COMPUTER SYSTEM

BACKGROUND OF THE INVENTION

1. Field of the Invention

The present invention generally relates to graphical user interfaces for computer systems, and in particular to a method, apparatus, and article of manufacture providing an "append" extension to cut and copy commands for a clipboard function in a computer system.

2. Description of Related Art

Most operating systems for personal computers, such as OS/2™, Windows™, and Macintosh™, provide a "clipboard" function that can be used by computer programs to allow users to Copy, Cut, and Paste selected data from one application to another or within the same application. This function is used extensively because it allows the user to avoid reentering data already present in the computer. Generally, all kinds of data, including text, graphics, equations, and tables, can be transferred to and from the clipboard function.

The clipboard function provides both "Edit" functions and a reserved area of memory. The reserved area of memory temporarily stores the copied data. The Edit functions, including Copy, Cut, and Paste commands, may be invoked from a drop-down menu or short-cut keystrokes. The Copy command copies from the display into the clipboard memory. The Cut command removes the selected data from the display into the clipboard memory. The Paste command copies the contents of the clipboard memory to an indicated insertion point.

Prior to copying or cutting the data into the clipboard memory, the data must be selected. The user generally uses the keyboard or mouse to select the desired data from a screen display. Then, the user invokes either the Copy or Cut command, and the selected data is transferred by the operating system or application into the clipboard memory.

To select text with the mouse, the user usually positions an "I-beam" pointer at the beginning of the desired text, clicks and holds down the left mouse button, drags the pointer to the end of the desired text, and releases the left mouse button. To select text with the keyboard, the user usually positions the cursor at the beginning of the desired text, presses the Shift key, uses arrow keys to move to the end of the desired text, and then releases the Shift key. Such selected text typically appears on the screen display with a shaded background.

To select an object such as a graphics object with the mouse, the user usually clicks on the object. To select an object such as a graphics object with the keyboard, the user merely positions the cursor onto the object. Selected objects, such as graphics, usually appear with selection handles on each side and corner.

In the prior art, the copied data remains in the clipboard memory until it is replaced with another selected portion. If the user performs another Copy or Cut command, then the selected data replaces the contents of the clipboard memory. However, there is a need in the art for functionality that allows both copied and cut data to be appended to the current contents of a clipboard memory, without overwriting the previous contents, while also supporting the conventional implementation of the Copy, Cut, and Paste functions.

SUMMARY OF THE INVENTION

To overcome the limitations in the prior art described above this invention discloses a method, apparatus, and article of manufacture providing an "append" extension to cut and copy commands for a clipboard function in a computer system that also support the conventional implementation of the Copy, Cut, and Paste functions.

BRIEF DESCRIPTION OF THE DRAWINGS

Referring now to the drawings in which like reference numbers represent corresponding parts throughout.

DETAILED DESCRIPTION OF THE INVENTION

In the following description, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
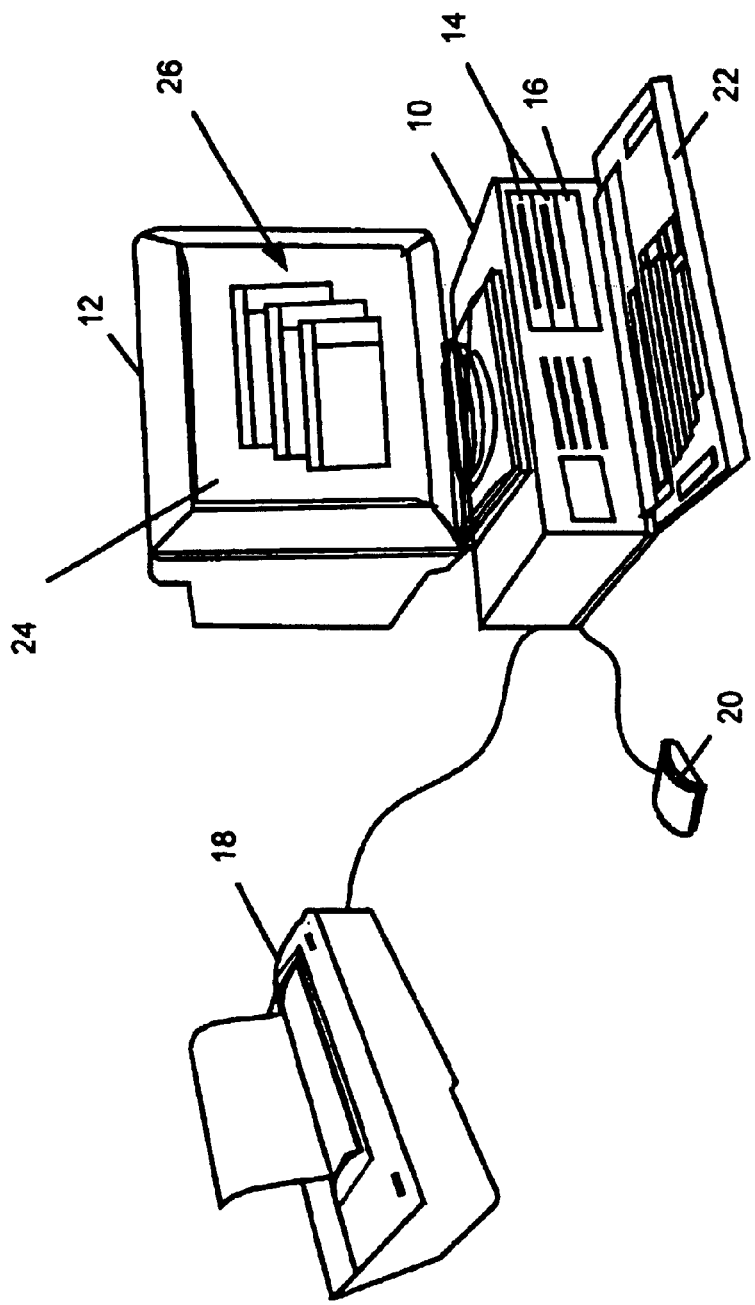
FIG. 1 is a block diagram that illustrates an exemplary hardware environment of the present invention.

FIG. 1 is a block diagram that illustrates an exemplary hardware environment of the present invention. The present invention is typically implemented using a personal computer 10 comprised of a microprocessor, random access memory (RAM), read-only memory (ROM), and other components. It is envisioned that attached to the personal computer 10 may be a monitor 12, hard and/or floppy disk drives 14, CD-ROM drives 16, printer 18, and other peripherals. Also included in the preferred embodiment may be input devices, for example, a mouse pointing device 20 and a keyboard 22.

Those skilled in the art will recognize that the exemplary environment illustrated in FIG. 1 is not intended to limit the present invention. Indeed, those skilled in the art will recognize that other alternative hardware environments may be used without departing from the scope of the present invention.

The personal computer 10 operates under the control of an operating system 24, such as the OS/2™, Windows™, or Macintosh™ operating systems, which is represented in FIG. 1 by the screen display on the monitor 12. The personal computer 10 executes one or more computer programs 26, which are represented in FIG. 1 by the "windows" displayed on the monitor 12, operating under the control of the operating system 24.

Generally, the operating system 24 and the computer programs 26 are tangibly embodied in a computer-readable medium, e.g. one or more of the fixed and/or removable data storage devices 14 and 16. Both the operating system 24 and the computer programs 26 may be loaded from the data storage devices 14 and 16 into the random access memory of the computer 10 for execution by the microprocessor. Both the operating system 24 and the computer programs 26 comprise instructions which, when read and executed by the microprocessor of the computer 10, causes the computer 10 to perform the steps necessary to execute the steps or elements of the present invention.

The present invention comprises an enhanced clipboard function that is preferably implemented by functions resident in the operating system 24 and/or computer programs 26, which functions access a designated portion of the random access memory of the computer 10 known as a clipboard memory. In the present invention, the computer displays data on the monitor 12 and then receives commands from an operator. A first command received from the operator would be to select a portion of the data displayed on the monitor 12, and the computer 10 would then select the portion of the data displayed on the monitor 12 in response thereto. A second command received from the operator may comprise a "copy" command that instructs the computer 10 to copy the selected portion into a clipboard in a memory of the computer 10. The second command may also comprise a "cut" command that instructs the computer 10 to copy the selected portion into the clipboard in the memory of the computer 10 and then erase the selected portion from the data displayed on the monitor 12. Further, in either instance, the second command indicates whether to replace the contents of the clipboard with the selected portion or whether to append the selected portion to the contents of the clipboard. The computer 10 would then copy and/or cut the selected data to the clipboard in the memory in accordance with the first and second commands. In either instance, the selected portion of data may be all of the displayed data on the monitor 12, or a sub-part of the displayed data on the monitor 12.

Figure 2:
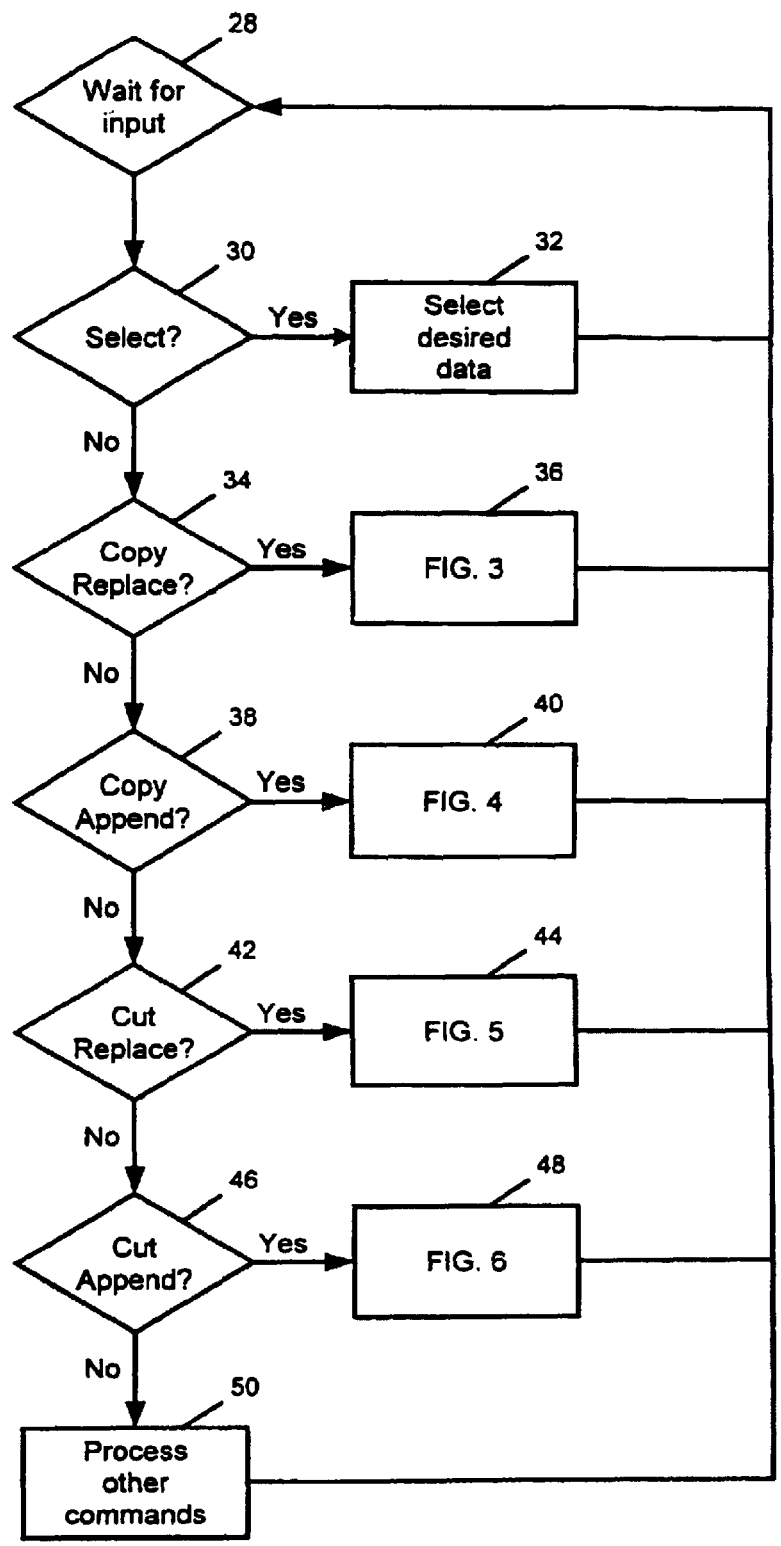
FIG. 2 is a flowchart illustrating the operation of the computer in accordance with the present invention.

FIG. 2 is a flowchart illustrating the operation of the computer 10 in accordance with the present invention. Block 28 represents the computer 10 waiting for input, such as the activation of a key on the keyboard, the activation of a selection button on the mouse, or any other activation via an input device. After input is received, control transfers to Block 30.

Block 30 is a decision block that represents the computer 10 determining whether the input indicates that the user has entered a command to select a portion of the data displayed on the monitor 12. If so, control transfers to Block 32, which represents the computer 10 selecting the desired data.

Block 34 is a decision block that represents the computer 10 determining whether the input indicates that the user has entered a copy/replace command to copy the selected data into the clipboard memory replacing the current contents of the memory. If so, control transfers to Block 36, which represents the computer 10 performing the copy/replace function, as described in more detail in FIG. 3.

Block 38 is a decision block that represents the computer 10 determining whether the input indicates that the user has entered a copy/append command to copy the selected data. If so, control transfers to Block 40, which represents the computer 10 performing the copy/append function, as described in more detail in FIG. 4.

Block 42 is a decision block that represents the computer 10 determining whether the input indicates that the user has entered a cut/replace command to cut the selected data. If so, control transfers to Block 44, which represents the computer 10 performing the cut/replace function, as described in more detail in FIG. 5.

Block 46 is a decision block that represents the computer 10 determining whether the input indicates that the user has entered a cut/append command for the selected data. If so, control transfers to Block 48, which represents the computer 10 performing the cut/append function, as described in more detail in FIG. 6.

Block 50 represents the computer 10 processing all other commands, after which control transfers back to Block 28 to wait for additional input.

Figure 3:
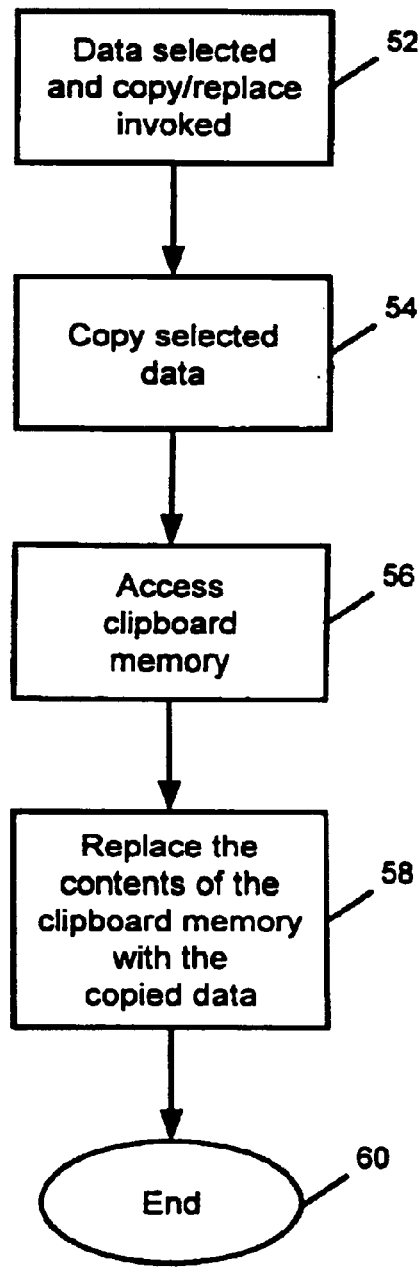
FIG. 3 is a flowchart showing the steps performed by the computer for the copy/replace function.

FIG. 3 is a flowchart showing the steps performed by the computer 10 for the copy/replace function. Block 52 represents the start of the function, wherein data has been selected and the copy/replace function invoked by the operator. Block 54 represents the computer 10 copying the selected data. Block 56 represents the computer 10 accessing the clipboard memory. Block 58 represents the computer 10 replacing the contents of the clipboard memory with the copied data. Block 60 represents the termination of the function.

Figure 4:
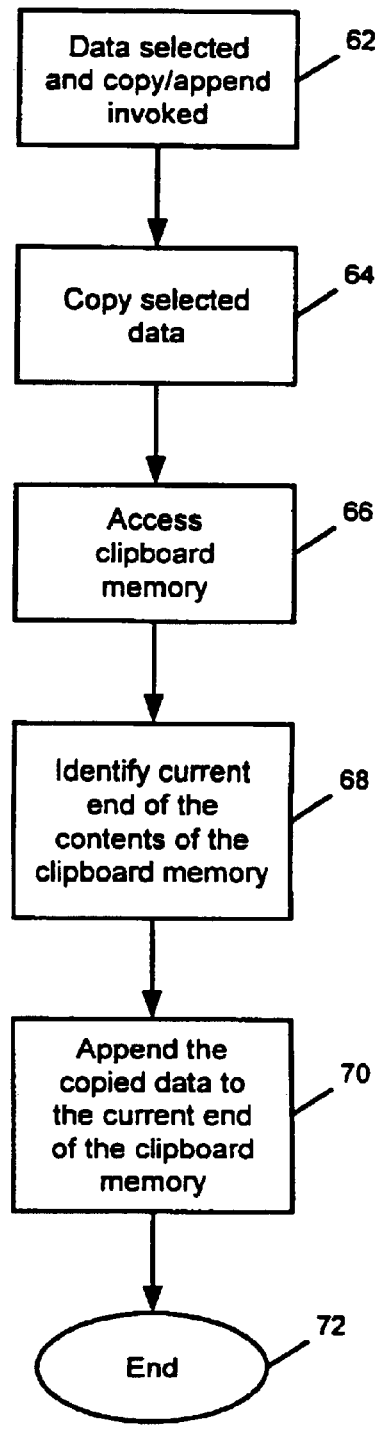
FIG. 4 is a flowchart showing the steps performed by the computer for the copy/append function.

FIG. 4 is a flowchart showing the steps performed by the computer 10 for the copy/append function. Block 62 represents the start of the function, wherein data has been selected and the copy/append function invoked by the operator. Block 64 represents the computer 10 copying the selected data. Block 66 represents the computer 10 accessing the clipboard memory. Block 68 represents the computer 10 identifying the current end of the contents of the clipboard memory. Block 70 represents the computer 10 appending the copied data to the current end of the contents of the clipboard memory. Block 72 represents the termination of the function.

Figure 5:
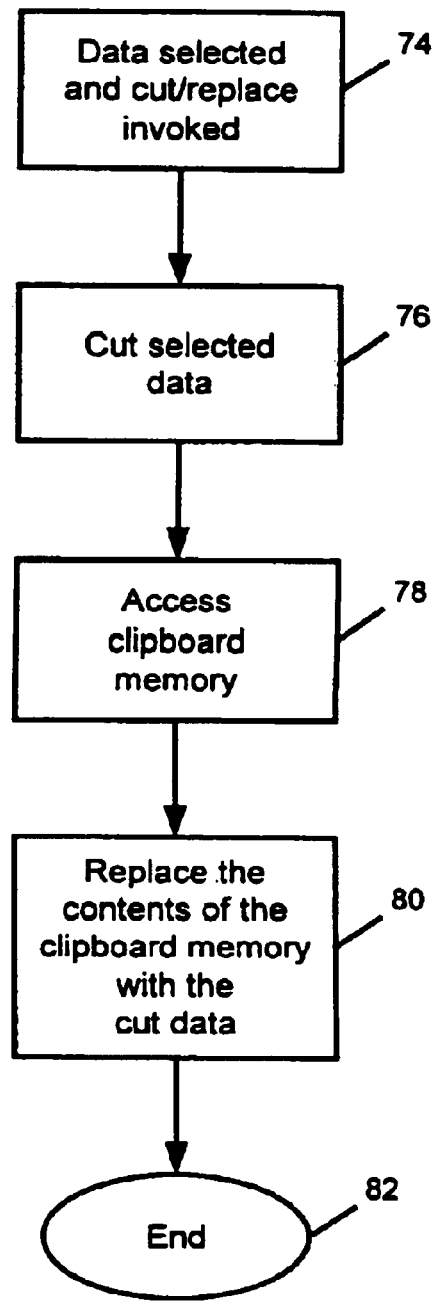
FIG. 5 is a flowchart showing the steps performed by the computer for the cut/replace function.

FIG. 5 is a flowchart showing the steps performed by the computer 10 for the cut/replace function. Block 74 represents the start of the function, wherein data has been selected and the cut/replace function invoked by the operator. Block 76 represents the computer 10 cutting the selected data. Block 78 represents the computer 10 accessing the clipboard memory. Block 80 represents the computer 10 replacing the contents of the clipboard memory with the cut data. Block 82 represents the termination of the function.

Figure 6:
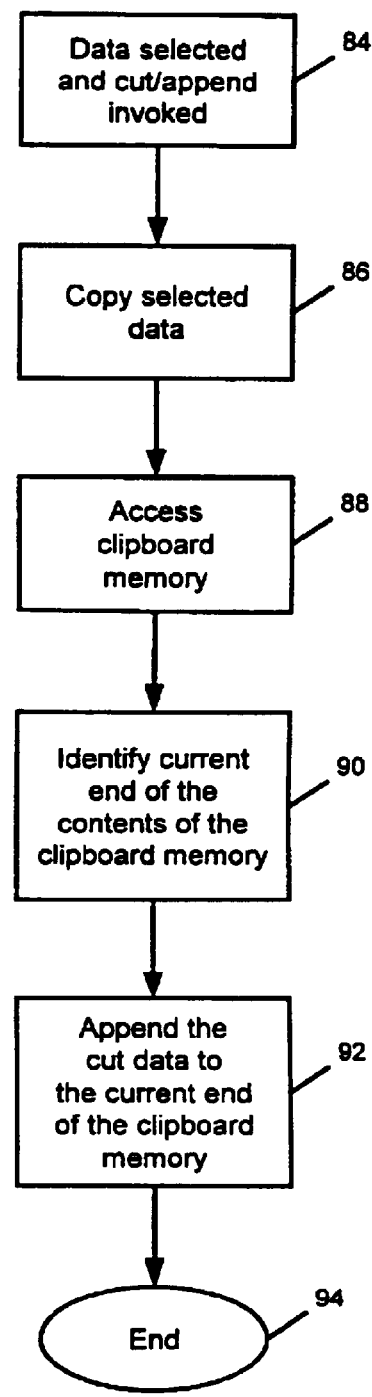
FIG. 6 is a flowchart showing the steps performed by the computer for the cut/append function.

FIG. 6 is a flowchart showing the steps performed by the computer 10 for the cut/append function. Block 84 represents the start of the function, wherein data has been selected and the cut/append function invoked by the operator. Block 86 represents the computer 10 cutting the selected data. Block 88 represents the computer 10 accessing the clipboard memory. Block 90 represents the computer 10 identifying the current end of the contents of the clipboard memory. Block 92 represents the computer 10 appending the cut data to the current end of the contents of the clipboard memory. Block 94 represents the termination of the function.

With regard to FIGS. 4 and 6 above, it will be noted by those skilled in the art that the present invention is not limited to appending the selected data to the current end of the contents of the clipboard memory. Indeed, the selected data could be appended anywhere in clipboard memory, such as the beginning of the clipboard memory or the middle of the clipboard memory.

Figure 7A:
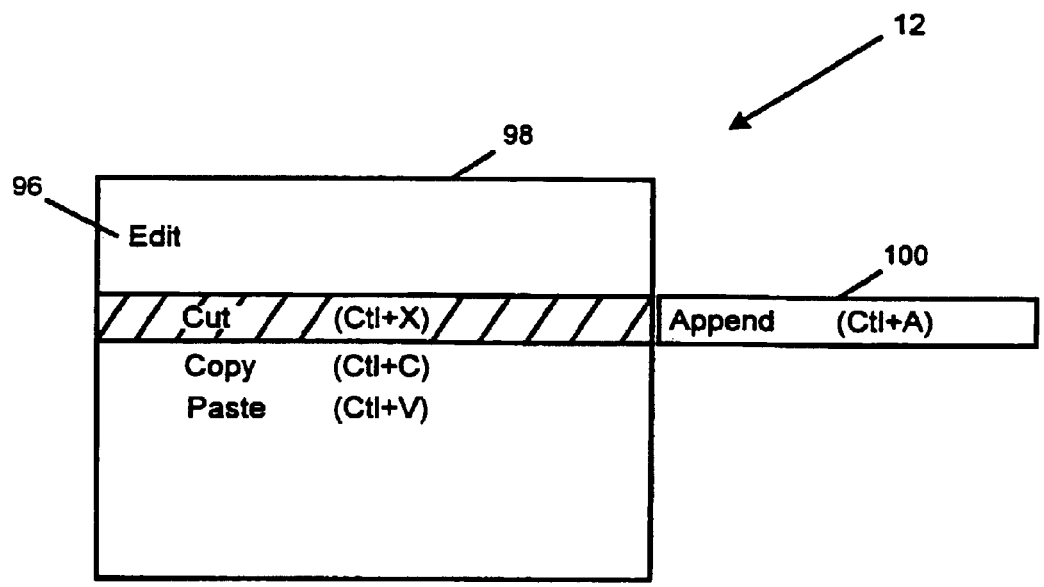
FIGS. 7A and 7B illustrate one possible embodiment of the user interface displayed on the monitor according to the present invention.
Figure 7B:
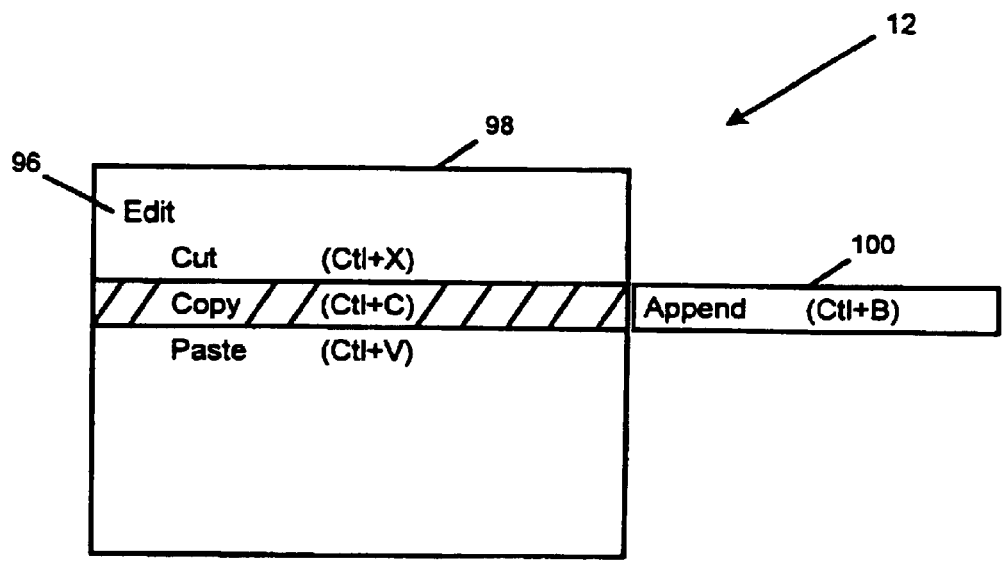

FIGS. 7A and 7B illustrate one possible embodiment of the user interface displayed on the monitor 12 according to the present invention. When the user moves the pointer to the Edit command 96 and presses a button on the mouse, a pull-down menu 98 is displayed on the monitor 12. The pull-down menu 98 includes mnemonics for the Copy, Cut, and Paste commands. In the prior art, the operator would position the mouse cursor on the desired command and invoke the command by depressing one of the mouse buttons. In the preferred embodiment of the present invention, the positioning of the mouse cursor on the Copy or Cut commands results in the display of a cascading sub-menu 100 on the monitor 12. This submenu 100 includes the Append sub-command or option for the Copy and Cut commands, wherein FIG. 7A shows the submenu 100 for the Cut Command and FIG. 7B shows the submenu for the Copy command. The operator positions the mouse cursor on the desired command or sub-command and invokes the command or sub-command by depressing one of the mouse buttons. The key combinations (Ctl+X, Ctl+C, Ctl+V, Ctl+A, Ctl+B) shown in the pull-down menus of FIGS. 7A and 7B are shortcut keys for choosing the associated command or sub-command without using a mouse and menu.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of manipulating displayed data on a monitor attached to a computer, comprising the steps of:
   displaying data in a document on the monitor;
   selecting a first portion of the data displayed in the document in response to input from an operator;
   in response to a command from the operator to copy or cut the selected first portion of the data displayed in the document into a clipboard in a memory of the computer, placing the selected first portion of the data into the clipboard;
   returning to the document from the clipboard and selecting a second portion of the data displayed in the document in response to input from an operator; and
   in response to a command from the operator to copy or cut the selected second portion of the data from the document into the clipboard in the memory of the computer, appending the selected second portion of the data displayed in the document to the selected first portion of the data previously placed in the clipboard, without overwriting the first portion of the data in the clipboard, wherein appending further comprises accessing the clipboard, identifying a location in the clipboard, and appending the selected second portion of the data to the identified location in the clipboard.

2. The method of claim 1, further comprising the step of erasing the selected portion from the data displayed on the monitor.

3. The method of claim 1, wherein the selected portion is all of the displayed data on the monitor.

4. The method of claim 1, wherein the selected portion is a sub-part of the displayed data on the monitor.

5. The method of claim 1, wherein the first and second operator commands are selected from a pull-down menu.

6. The method of claim 5, wherein the pull-down menu is presented in a cascading manner.

7. The method of claim 1, wherein the first and second operator commands comprise shortcut keys.

8. An apparatus for manipulating displayed data, comprising:
   a computer having a memory and a monitor;
   means, performed by the computer, for displaying data in a document on the monitor;
   means, performed by the computer, for selecting a first portion of the data displayed in the document in response to input from an operator;
   means, performed by the computer, for, in response to a command from the operator to copy or cut the selected first portion of the data displayed in the document into a clipboard in a memory of the computer, placing the selected first portion of the data into the clipboard;
   means, performed by the computer, for, returning to the document from the clipboard and selecting a second portion of the data displayed in the document in response to input from an operator; and
   means, performed by the computer, for, in response to a command from the operator to copy or cut the selected second portion of the data from the document into the clipboard in the memory of the computer, appending the selected second portion of the data displayed in the document to the selected first portion of the data previously placed in the clipboard, without overwriting the first portion of the data in the clipboard, wherein appending further comprises accessing the clipboard, identifying a location in the clipboard, and appending the selected second portion of the data to the identified location in the clipboard.

9. The apparatus of claim 8, further comprising means for erasing the selected portion from the data displayed on the monitor.

10. The apparatus of claim 8, wherein the selected portion is all of the displayed data on the monitor.

11. The apparatus of claim 8, wherein the selected portion is a sub-part part of the displayed data on the monitor.

12. The apparatus of claim 8, wherein the first and second operator commands are selected from a pull-down menu.

13. The apparatus of claim 12, wherein the pull-down menu is presented in a cascading manner.

14. The apparatus of claim 8, wherein the first and second operator commands comprise shortcut keys.

15. A program storage device, readable by a computer having a memory, tangibly embodying one or more programs of instructions executable by the computer to perform method steps for manipulating displayed data on a monitor attached to the computer, the method comprising the steps of:
   displaying data in a document on the monitor;
   selecting a first portion of the data displayed in the document in response to input from an operator;
   in response to a command from the operator to copy or cut the selected first portion of the data displayed in the document into a clipboard in a memory of the computer, placing the selected first portion of the data into the clipboard;
   returning to the document from the clipboard and selecting a second portion of the data displayed in the document in response to input from an operator; and
   in response to a command from the operator to copy or cut the selected second portion of the data from the document into the clipboard in the memory of the computer, appending the selected second portion of the data displayed in the document to the selected first portion of the data previously placed in the clipboard, without overwriting the first portion of the data in the clipboard, wherein appending further comprises accessing the clipboard, identifying a location in the clipboard, and appending the selected second portion of the data to the identified location in the clipboard.

16. The program storage device of claim 15, further comprising the step of erasing the selected portion from the data displayed on the monitor.

17. The program storage device of claim 15, wherein the selected portion is all of the displayed data on the monitor.

18. The program storage device of claim 15, wherein the selected portion is a sub-part of the displayed data on the monitor.

19. The program storage device of claim 15, wherein the first and second operator commands are selected from a pull-down menu.

20. The program storage device of claim 19, wherein the pull-down menu is presented in a cascading manner.

21. The program storage device of claim 15, wherein the first and second operator commands comprise shortcut keys.

* * * * *

UNITED STATES PATENT AND TRADEMARK OFFICE
CERTIFICATE OF CORRECTION

PATENT NO. : 6,961,907 B1
APPLICATION NO. : 08/676500
DATED : November 1, 2005
INVENTOR(S) : Bailey It is certified that error appears in the above-identified patent and that said Letters Patent is hereby corrected as shown below:

Title page,

Item [56], References Cited, Other Publications line 8,

Should add the following publications from Information Disclosure Statement filed on October 6, 2004:

Person, R., and Rose, K., Using Windows 3.1, Special Edition, 1993, pp. 55-56, 91-94, 211-222, 485-490, 593-594, and 647-648.

Petzold, Programming Windows 3.1, $3^{rd}$ Edition, 1992, pp. 251-252 and 791-822.

Najjar, L.J. and Zimmatore, J.J., "Multiple Item On-Line Clipboard," IBM Technical Disclosure Bulletin, Vol. 35, No. 2, July 1992.

Haynes, T., Melkus, L. and Schell, D., "Combined Cut (or Copy) and Paste Functions Via Menus in a GUI," IBM Technical Disclosure Bulletin, Vol. 35, No. 6, November 1992.

"Advantis Passport for Windows", Advantis Corporation (copy not provided).

Signed and Sealed this

Nineteenth Day of February, 2008

JON W. DUDAS
*Director of the United States Patent and Trademark Office*